United States Patent
Lin et al.

(10) Patent No.: US 11,640,802 B2
(45) Date of Patent: May 2, 2023

(54) DISPLAY DEVICE AND DISPLAY DEVICE DRIVING METHOD

(71) Applicant: E Ink Holdings Inc., Hsinchu (TW)

(72) Inventors: Huei-Jyun Lin, Hsinchu (TW);
Chun-Ta Chien, Hsinchu (TW);
Chia-Hao Kuo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/655,176

(22) Filed: Mar. 17, 2022

(65) Prior Publication Data

US 2022/0375390 A1 Nov. 24, 2022

Related U.S. Application Data

(60) Provisional application No. 63/190,792, filed on May 20, 2021.

(51) Int. Cl.
*G09G 3/34* (2006.01)
*G06F 3/041* (2006.01)

(52) U.S. Cl.
CPC ........... *G09G 3/344* (2013.01); *G06F 3/0412* (2013.01); *G06F 3/04184* (2019.05); *G09G 2310/0213* (2013.01); *G09G 2310/0218* (2013.01); *G09G 2310/0267* (2013.01)

(58) Field of Classification Search
CPC .......... G06F 3/0416–04186; G06F 3/041–048; G09G 2310/0213; G09G 3/3266; G09G 3/3674–3681; G09G 2310/0267
See application file for complete search history.

(56) References Cited

U.S. PATENT DOCUMENTS

| | | | |
|---|---|---|---|
| 9,207,823 B2 | 12/2015 | Baek | |
| 9,329,721 B1* | 5/2016 | Buuck | G06F 3/04184 |
| 9,383,851 B2* | 7/2016 | Wyatt | G09G 5/393 |
| 9,606,655 B2* | 3/2017 | Choo | G06F 3/0412 |
| 9,727,168 B2* | 8/2017 | Fuller | G06F 3/0446 |
| 9,851,831 B2 | 12/2017 | Wang | |
| 9,927,910 B2* | 3/2018 | Brunet | G06F 3/04166 |

(Continued)

FOREIGN PATENT DOCUMENTS

| | | |
|---|---|---|
| CN | 1719501 A | 1/2006 |
| CN | 106710506 A | 5/2017 |

(Continued)

OTHER PUBLICATIONS

The office action of corresponding TW application No. 111109751 dated Feb. 17, 2023.

*Primary Examiner* — Patrick F Marinelli
(74) *Attorney, Agent, or Firm* — CKC & Partners Co., LLC

(57) ABSTRACT

A display device, comprising a display panel and a touch panel. The display panel comprises a plurality of scan lines. The plurality of scan lines are respectively classified into a plurality of scan areas, and the display panel is configured to sequentially scan the plurality of scan areas through the plurality of scanning lines. The touch panel is electrically connected to the display panel, and is configured to receive a touch signal. During a first frame period, when a position of the touch signal corresponds to one of plurality of the scan areas, the display panel is configured to start scanning the plurality of scan areas from the one of the plurality of the scan areas to display an image of the plurality of scan areas.

7 Claims, 3 Drawing Sheets

(56) References Cited

U.S. PATENT DOCUMENTS

| | | | |
|---|---|---|---|
| 9,946,401 B2 | 4/2018 | Shin | |
| 9,983,720 B2* | 5/2018 | Shin | G06F 3/0412 |
| 10,095,331 B2* | 10/2018 | Zhuang | G09G 3/20 |
| 10,162,464 B2* | 12/2018 | Brunet | G06F 3/04184 |
| 10,318,064 B2* | 6/2019 | Qian | G06F 3/04184 |
| 10,338,727 B2* | 7/2019 | Yu | G06F 3/04166 |
| 10,359,885 B2* | 7/2019 | Brahma | G02F 1/13338 |
| 10,474,265 B2* | 11/2019 | So | G02F 1/13338 |
| 10,503,292 B2* | 12/2019 | Shang | G06F 3/0446 |
| 10,521,042 B2* | 12/2019 | Lu | G06F 3/04184 |
| 10,838,539 B2* | 11/2020 | Hwang | G06F 3/0416 |
| 11,175,762 B2* | 11/2021 | Hotelling | G06F 3/04184 |
| 11,320,934 B1* | 5/2022 | Vaze | G06F 3/0445 |
| 11,429,215 B2* | 8/2022 | Park | H01L 27/3276 |
| 2012/0056835 A1* | 3/2012 | Choo | G06F 3/04184 |
| | | | 345/173 |
| 2013/0162550 A1 | 6/2013 | Chen et al. | |
| 2015/0070318 A1* | 3/2015 | Noguchi | G09G 3/3674 |
| | | | 345/87 |
| 2015/0193062 A1* | 7/2015 | Wyatt | G09G 5/393 |
| | | | 345/173 |
| 2015/0194137 A1* | 7/2015 | Wyatt | G09G 5/393 |
| | | | 345/173 |
| 2016/0328037 A1* | 11/2016 | Zhuang | G06F 3/04166 |
| 2016/0334928 A1* | 11/2016 | Fuller | G06F 3/0445 |
| 2016/0342248 A1* | 11/2016 | Ye | G06F 3/04184 |
| 2017/0038873 A1* | 2/2017 | Shang | G09G 3/2092 |
| 2017/0052635 A1* | 2/2017 | Yu | G09G 3/3688 |
| 2017/0052637 A1* | 2/2017 | Lu | G06F 3/0412 |
| 2017/0123552 A1* | 5/2017 | Brunet | G06F 3/04184 |
| 2017/0177154 A1* | 6/2017 | Choo | G09G 3/3275 |
| 2018/0059868 A1* | 3/2018 | Brahma | G09G 3/2022 |
| 2018/0095572 A1* | 4/2018 | So | G09G 3/3677 |
| 2018/0173363 A1* | 6/2018 | Brunet | G06F 3/04166 |
| 2019/0129564 A1 | 5/2019 | Kim et al. | |
| 2019/0259344 A1* | 8/2019 | Shi | G09G 3/20 |
| 2021/0294492 A1* | 9/2021 | Chen | G06F 3/041661 |
| 2021/0295764 A1* | 9/2021 | Lin | G09G 3/2096 |
| 2021/0333974 A1* | 10/2021 | Chen | G06F 3/041661 |
| 2022/0044610 A1* | 2/2022 | Choi | G06F 3/04166 |
| 2022/0066591 A1* | 3/2022 | Meng | G06F 3/0418 |
| 2022/0171494 A1* | 6/2022 | Shih | G09G 3/20 |

FOREIGN PATENT DOCUMENTS

| | | |
|---|---|---|
| CN | 106448593 B | 9/2019 |
| TW | 202032413 A | 9/2020 |

* cited by examiner

DISPLAY DEVICE AND DISPLAY DEVICE DRIVING METHOD

CROSS-REFERENCE TO RELATED APPLICATION

This application claims priority to U.S. Provisional Application Ser. No. 63/190,792, filed May 20, 2021, which is herein incorporated by reference in its entirety.

BACKGROUND

Technical Field

The present disclosure relates to a display device and a display device driving method, especially a device with both touch and image display functions.

Description of Related Art

Currently, in the market of various consumer electronic products, "reflective display device" is widely used as a display panel, such as an electronic paper display device. The reflective display device mainly uses an incident light to irradiate a display medium layer to display an image, thereby saving power. However, with the improvement of imaging technology, the functions of the reflective display device are becoming more and more diversified, such as improving color or resolution, or combining touch functions. With the improvement of functions, how to ensure the display quality of the reflective display device has become a major issue at present.

SUMMARY

One aspect of the present disclosure is a display device, comprising a display panel and a touch panel. The display panel comprises a plurality of scan lines. The plurality of scan lines are respectively classified into a plurality of scan areas, and the display panel is configured to sequentially scan the plurality of scan areas through the plurality of scanning lines. The touch panel is electrically connected to the display panel, and is configured to receive a touch signal. During a first frame period, when a position of the touch signal corresponds to one of plurality of the scan areas, the display panel is configured to start scanning the plurality of scan areas from the one of the plurality of the scan areas to display an image of the plurality of scan areas.

Another aspect of the present disclosure is a display device driving method, comprising: receiving, by a touch panel, a touch signal during a first frame period, wherein a position of the touch panel corresponds to a display panel of a display device, and the display panel comprises a plurality of scan areas; determining a position of the touch signal corresponds to one of the plurality of scan areas; and starting scanning, by the touch panel, the plurality of scan areas from the one of the plurality of the scan areas to display an image of the plurality of scan areas.

Another aspect of the present disclosure is a display device, comprising a display panel and a touch device. The display panel comprises a plurality of scan lines. The plurality of scan lines are respectively classified into a plurality of scan areas, and the plurality of scan areas correspond to a plurality of scan orders. The touch device is integrated into the display panel, electrically connected to the display panel, and is configured to receive a touch signal. During a first frame period, when a position of the touch signal corresponds to one of the plurality of the scan areas, the display panel is configured to scan a part of the scan area, and the plurality of scan orders of the part of the scan area are equal to or greater than an order of the one of the plurality of the scan areas.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
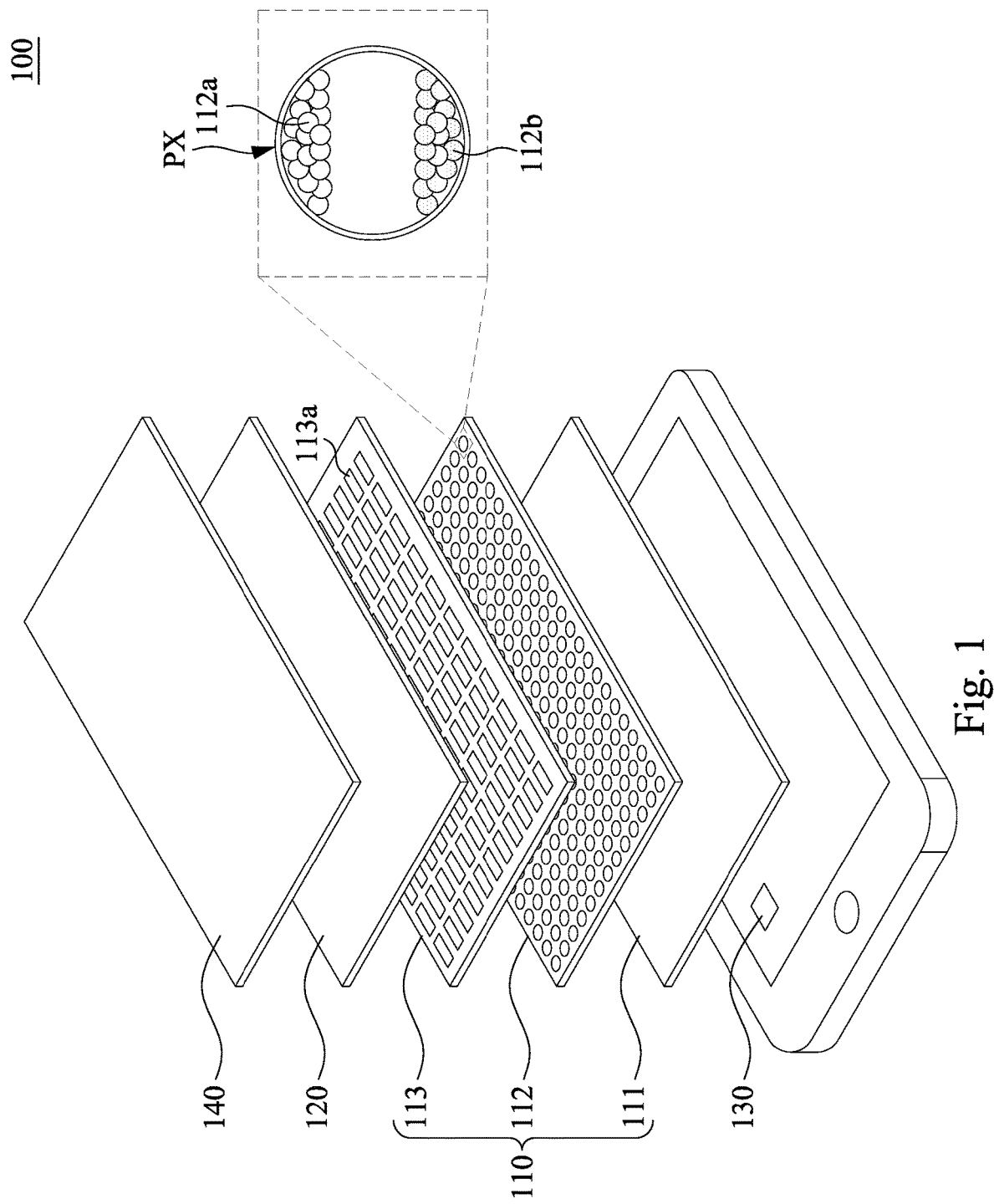
FIG. 1 is a schematic diagram of a display device in some embodiments of the present disclosure.

FIG. 1 is a schematic diagram of a display device 100 in some embodiments of the present disclosure. The display device 100 at least includes a display panel 110 and a touch panel 120. The display panel 110 is configured to receive an image signal, and is configured to control multiple internal pixel units PX to present an image. In one embodiment, the display panel 110 may be a reflective display device, such as an electronic paper, but the present disclosure is not limited to electronic paper, and can also be applied to other types of display devices. The above touch panel 120 is not limited to an independent panel structure, but can also be a touch device integrated in the display panel 110. For example, an in-cell touch panel. In this embodiment, the structure of the touch panel is used as an example to illustrate.

The display panel 110 includes a transistor array layer 111 and an electronic ink layer 112. The transistor array layer 111 (e.g., Thin-Film Transistor array) forms an electric field according to a control voltage to adjust positions of a plurality of electrophoretic particles 112a and 112b in the electronic ink layer 112, thereby displaying different gray-scale colors. The electronic ink layer 112 of the present disclosure is formed by the electrophoretic particles 112a and 112b being encapsulated in a plurality of microcapsules or microcups, respectively, to be used as a plurality of the pixel units PX, but the electronic ink layer 112 of the present disclosure is not limited to the above structure.

As mentioned above, in one embodiment, the display panel 110 further includes a color filter layer 113 (e.g., color filter array). The color filter layer 113 includes multiple filter units 113a, such as filter unit with red, green and blue. Each position of the filter units 113a corresponds to one or more pixel units PX. The filter units 113a are arranged in a specific manner, so that a grayscale image displayed by the electronic ink layer 112 can form a color image by the color filter layer 113.

The touch panel 120 is electrically connected to the display panel 110, and is configured to receive the touch signal. In one embodiment, the touch panel 120 includes multiple touch electrodes, and is configured to detect changes in impedance or capacitance (i.e., the touch signal), so as to determine the position of the foreign object (e.g., the user's finger or stylus) when it touches the display device 100.

Specifically, the display device 100 further includes a processor 130. The processor 130 is electrically connected to the display panel 110 and the touch panel 120, and is configured to transmit the image signal to the display panel 110. The processor 130 is further configured to transmit multiple sensing signals to multiple first touch electrodes of the touch panel 120, and is configured to receive a detect signal by multiple second touch electrodes of the touch panel 120. When the foreign object touches the display device 100, the mutual capacitance value between the first touch electrode and the second touch electrode will change, and the magnitude of the sensing signals will reflect the change in these mutual capacitance values. Therefore, the processor 130 can calculate the position of the touch position corresponding to the X-axis and the Y-axis of the display device 100 according to the sensing signal.

It should be mentioned that the touch principle of the touch panel 120 is not limited to the above. Since those skilled in the art can understand the structures and principles of the display panel 110 and the touch panel 120, it will not be repeated here.

In addition, as the embodiment shown in FIG. 1, the signals are uniformly processed by the processor 130, and the processor 130 drives the display panel 110 and the touch panel 120 accordingly, but the setting of the processor 130 is not limited to FIG. 1. In some embodiments, each of the display panel 110 and the touch panel 120 may include a processor. In other words, in the description of the following paragraphs, the operations of the processor 130 can be performed by the processing units in the display panel 110 and the touch panel 120 respectively. Similarly, in the following paragraphs, the operations performed by the display panel 110 and the touch panel 120 can also be performed uniformly by the processor 130, and the processor 130 can transmit corresponding driving signals to the display panel 110 or the touch panel 120.

Figure 2:
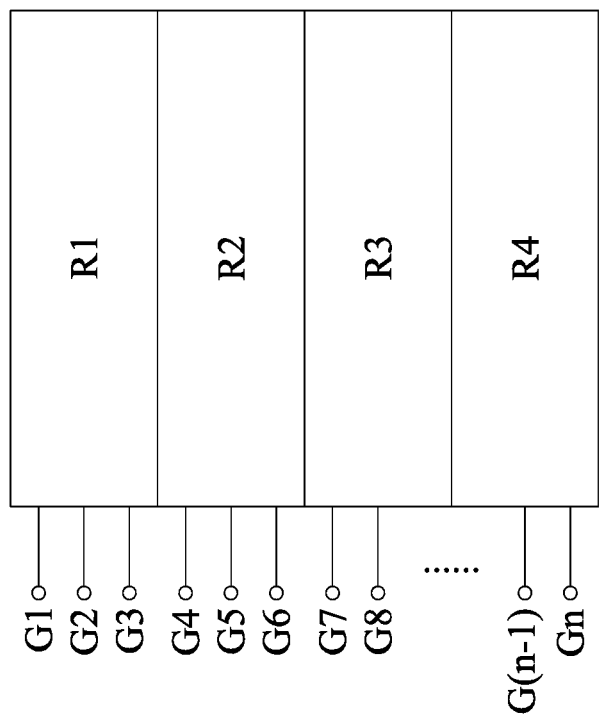
FIG. 2 is a schematic diagram of a display device in some embodiments of the present disclosure.

Referring to FIG. 1 and FIG. 2, FIG. 2 is a schematic diagram of a display panel 110 in some embodiments of the present disclosure. In one embodiment, the display panel 110 includes multiple scan lines G1-Gn. The display panel 110 is configured to control the pixels or light transmittance presented by each of the pixel units PX through the scan lines G1-Gn. The display panel 110 includes multiple display areas R1-R4, each of the scan lines G1-Gn is classified into one of the display areas R1-R4. For example, the scan lines G1-G3 are located in the first display area R1, and the scan lines G4-G6 are located in the second display area R2.

In some embodiments, the display area R1-R4 are arranged along a first direction (e.g., from top to bottom, or from left to right), and the scanning direction of the display panel 110 is also the first direction. The settings of the display areas R1-R4 are stored in the processor 130. For example, the processor 130 sets the scan lines G1-G3 to belong to the same area to define the first display area R1. Similarly, the processor 130 can set the coordinate range corresponding to the display area R1-R4, for example, the Y coordinate between 1-10 belongs to the first scan area R1.

When the display panel 110 receives the image signal, the display panel 110 (or the processor 130) generates the control voltage according to the image signal, and sequentially scans the pixel units PX in each the display area R1-R4 through the scan lines G1-Gn.

The foregoing embodiment describes a method for displaying an image when the display device 100 does not receive a touch signal. If the display device 100 determines that the touch signal is received, during the current frame period, the display panel 110 (or the processor 130) determines which one of the scan areas R1-R4 corresponds to the position of the touch signal. After confirming the corresponding scan area, the display panel 110 (or the processor 130) starts scanning from the corresponding scan area to update the display image on the display device 100.

Alternatively stated, when the display device 100 does not receive the touch signal, the display panel 110 scans the scan areas R1-R4 according to preset scan orders (e.g., the order from top to bottom is 1, 2, 3 . . . ). if the display device 100 determines that the touch signal is received, then during the current frame period, the display panel 110 only scans a part of the scan area, wherein the scan orders of the part of the scan area are equal to or greater than an order of the corresponding one of the plurality of the scan areas. For example, the touch position corresponds to the second scan area R2 (i.e., the scan order Is "2"), during the current frame period, the display panel 110 sequentially scans the second scan area R2, the third scan area R3 (the scan order is "3") and the fourth scan area R4 (the scan order is "4") along the first direction (e.g., vertical direction). During the current frame period, the display panel 110 does not scan the first scan area R1. Accordingly, the display panel 110 can instantly update the image according to the touch signal (e.g., handwriting), so as to reduce the delay of image update.

Figure 3:
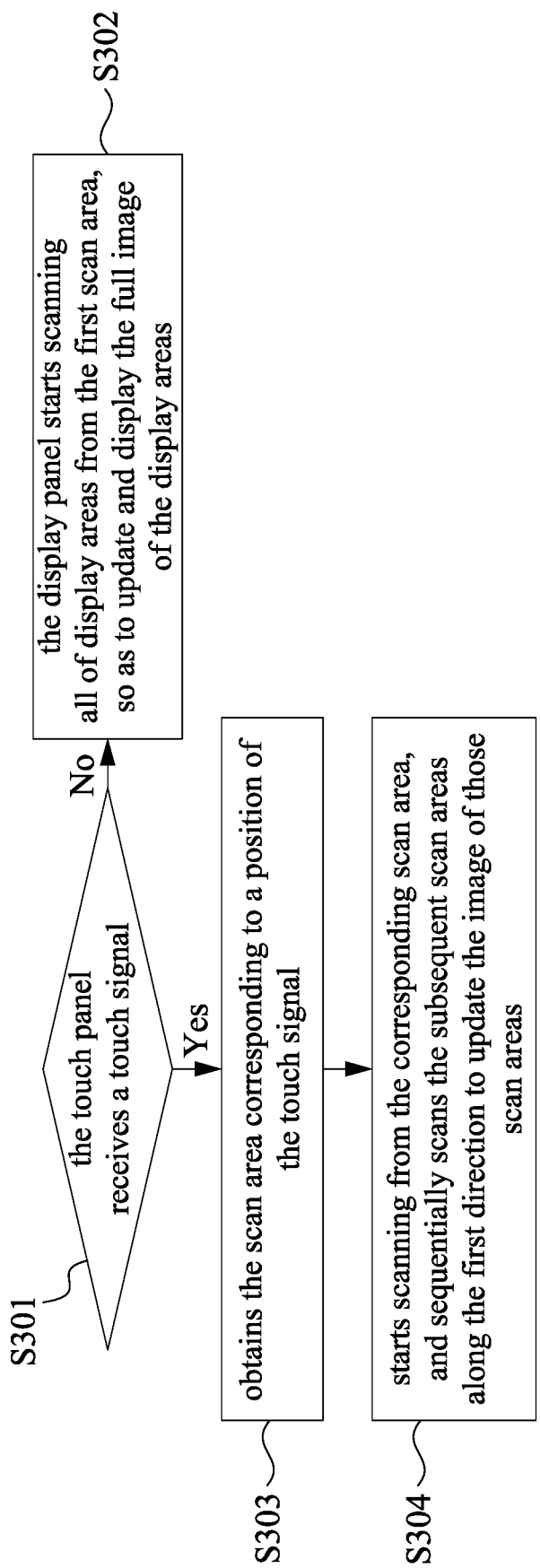
FIG. 3 is a flowchart illustrating a display device driving method in some embodiments of the present disclosure.

FIG. 3 is a flowchart illustrating a display device driving method in some embodiments of the present disclosure. In step S301, the display device 100 determines whether the touch panel 120 receives a touch signal. If the touch panel 120 does not receive the touch signal, in step S302, the display panel 110 starts to scan all of display areas R1-R4 from the first scan area R1 along the first direction (e.g., top to bottom), so as to update and display the full image of the display areas R1-R4.

On the other hand, if the touch panel 120 receives the touch signal, in step S303, the display panel 110 (or the processor 130) obtains the scan area corresponding to a position of the touch signal, and accordingly updates an image of a part of the display areas R1-R4. For example, the touch panel 120 (or the processor 130) first obtains the coordinate position according to the touch signal, then search out the corresponding scan area according to the coordinate position.

In step S304, after confirming the scan area corresponding to the touch signal, the display panel 110 (or the processor 130) starts scanning from the corresponding scan area, and sequentially scans the subsequent scan areas along the first direction to update the image of those scan areas. For example, the position of the touch signal corresponds to the third scan area R3, and is closest to the scan lines G8. In this case, the display panel 110 (or the processor 130) starts scanning from the first scan lines (i.e., the scan lines G7) of the third scan area R3, and displays the corresponding image. In other words, the display panel 110 only scans the scan lines G7-Gn to update and display the images on the third scan area R3 and the fourth scan area R4.

After updating the current image, in a new frame period, the display device 100 determines whether the touch signal is received again (i.e., returns to step S301), so as to determine the scanning mode in the new frame period. For example, if the touch signal is received during a first frame period, the display device 100 will only update a part of the scan areas corresponding to position of the touch signal (i.e., update a part of the screen). If the touch signal is not received during a second frame period, the display device 100 restores to scan all the scan areas and displays the full image (i.e., update all of the screen).

The display device 100 of the present disclosure selectively changes the scanning method according to the touch signal. That is to scan all of the scan areas R1-R4, or scan a part of the scan areas R1-R4. Accordingly, the display device 100 can be ensured to preferentially update the area on which the user performs the touch action, which effectively improves the delay problem that may occur when the display panel 110 updates the image.

As shown in FIG. 1, in one embodiment, the display device 100 further includes a front light module 140. The front light module 140 includes multiple light-emitting elements, which are configured to provide a front light source. In the embodiment shown in FIG. 1, although the display device 100 includes the front light module 140, in other embodiments, the display device 100 may only include the display panel 110 and the touch panel 120 (e.g., respectively includes a processing unit). In other words, the display panel 110 and the touch panel 120 can be packaged as an independent display module to be applied to any type of electronic device. Similarly, a display module can also be packaged with the processor 130. In addition, although in the embodiment shown in FIG. 1, the touch panel 120 is arranged on the display panel 110, but in other embodiments, the setting of the touch panel 120 and the display panel 110 can be adjusted according to requirements, and are not limited to the structure shown in FIG. 1.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A display device, comprising:
a display panel comprising a plurality of scan lines, wherein the plurality of scan lines are respectively classified into a plurality of scan areas, and the display panel is configured to sequentially scan the plurality of scan areas through the plurality of scanning lines; and
a touch panel electrically connected to the display panel, and configured to receive a touch signal,
wherein the plurality of scan areas are arranged along a first direction of the display device, and the display panel sequentially scans the plurality of scan areas along the first direction,
wherein during a first frame period, when a position of the touch signal corresponds to one of plurality of the scan areas, the display panel is configured to start scanning the plurality of scan areas from the one of the plurality of the scan areas to display an image of the plurality of scan areas and does not scan any preceding scan areas to the one of the plurality of the scan areas that are arranged along the first direction of the display device,
wherein after confirming the one of the plurality of the scan areas, the display panel starts scanning from the one of the plurality of the scan areas to update the image on the display device.

2. The display device of claim 1, wherein the plurality of scan areas at least comprises a first scan area, a second scan area and a third scan area, the first scan area, the second scan area and the third scan area are arranged along the first direction, when the position of the touch signal corresponds to the second scan area, the display panel sequentially scans the second scan area and the third scan area, and does not scan the first scan area during the first frame period.

3. The display device of claim 2, wherein during a second frame period, when the touch panel does not receive the touch signal, the touch panel starts scanning the plurality of scan areas from the first scan area.

4. A display device driving method, comprising:
receiving, by a touch panel, a touch signal during a first frame period, wherein a position of the touch panel corresponds to a display panel of a display device, the display panel comprises a plurality of scan areas arranged along a first direction of the display device, and the display panel sequentially scans the plurality of scan areas along the first direction;
determining a position of the touch signal corresponds to one of the plurality of scan areas; and
starting scanning, by the display panel, the plurality of scan areas from the one of the plurality of the scan areas to display an image of the plurality of scan areas and not scanning any preceding scan areas to the one of the plurality of the scan areas that are arranged along the first direction of the display device,
wherein after confirming the one of the plurality of the scan areas, the display panel starts scanning from the one of the plurality of the scan areas to update the image on the display device.

5. The display device driving method of claim 1, wherein the plurality of scan areas at least comprises a first scan area, a second scan area and a third scan area, the first scan area, the second scan area and the third scan area are arranged along the first direction, and starting scanning the plurality of scan areas from the one of the plurality of the scan areas further comprises: when the position of the touch signal corresponds to the second scan area, scanning sequentially the second scan area and the third scan area during the first frame period, but not the first scan area.

6. The display device driving method of claim 5, further comprising: when the touch panel does not receive the touch signal, starting scanning, by the display panel, the plurality of scan areas from the first scan area during a second frame period.

7. A display device, comprising:
a display panel comprising a plurality of scan lines, wherein the plurality of scan lines are respectively classified into a plurality of scan areas, and the plurality of scan areas correspond to a plurality of scan orders; and a touch device integrated into the display panel, electrically connected to the display panel, and configured to receive a touch signal, wherein the plurality of scan areas are arranged along a first direction of the display device, and the display panel sequentially scans the plurality of scan areas along the first direction, wherein during a first frame period, when a position of the touch signal corresponds to one of the plurality of the scan areas, the display panel is configured to start scanning the plurality of scan areas from the one of the plurality of the scan areas to display an image of the plurality of scan areas and does not scan any preceding scan areas to the one of the plurality of the scan areas that are arranged along the first direction of the display device, wherein after confirming the one of the plurality of the scan areas, the display panel starts scanning from the one of the plurality of the scan areas to update the image on the display device.

\* \* \* \* \*